No. 863,546. PATENTED AUG. 13, 1907.
E. MAHR.
TENDER FOR TRACTION ENGINES.
APPLICATION FILED MAR. 29, 1907.

2 SHEETS—SHEET 1.

Witnesses
Frank B. Hoffman

Inventor
Ernest Mahr
By Victor J. Evans
Attorney

No. 863,546. PATENTED AUG. 13, 1907.
E. MAHR.
TENDER FOR TRACTION ENGINES.
APPLICATION FILED MAR. 29, 1907.

2 SHEETS—SHEET 2.

Inventor
Ernest Mahr

Witnesses
Frank B. Hoffman.

By Victor J. Evans
Attorney

UNITED STATES PATENT OFFICE.

ERNEST MAHR, OF COLLEGE PLACE, WASHINGTON.

TENDER FOR TRACTION-ENGINES.

No. 863,546.　　　Specification of Letters Patent.　　　Patented Aug. 13, 1907.

Application filed March 29, 1907. Serial No. 365,382.

*To all whom it may concern:*

Be it known that I, ERNEST MAHR, a citizen of the United States of America, residing at College Place, in the county of Wallawalla and State of Washington, have invented new and useful Improvements in Tenders for Traction-Engines, of which the following is a specification.

This invention relates to tenders for traction engines, and one of the principal objects of the same is to provide a wheeled tender for carrying fuel and water which will be guided by the movements of the traction engine.

Another object of the invention is to provide a tender with a draft cable passing over pulleys on a draft bar and connected to the front axle of the traction engine so that the movements of the front axle will be communicated to the tender.

Figure 1:
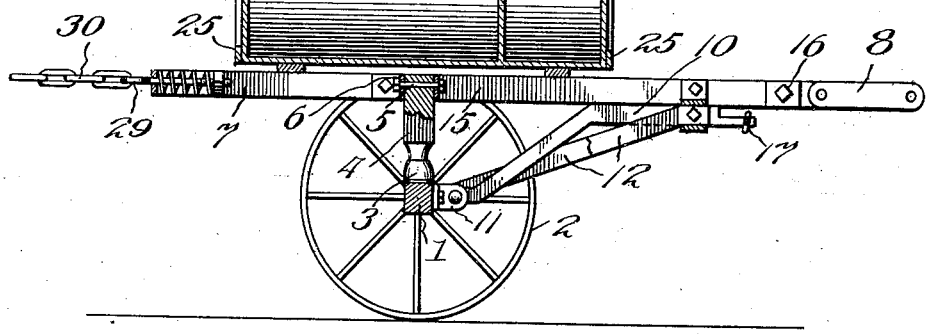
Figure 2:
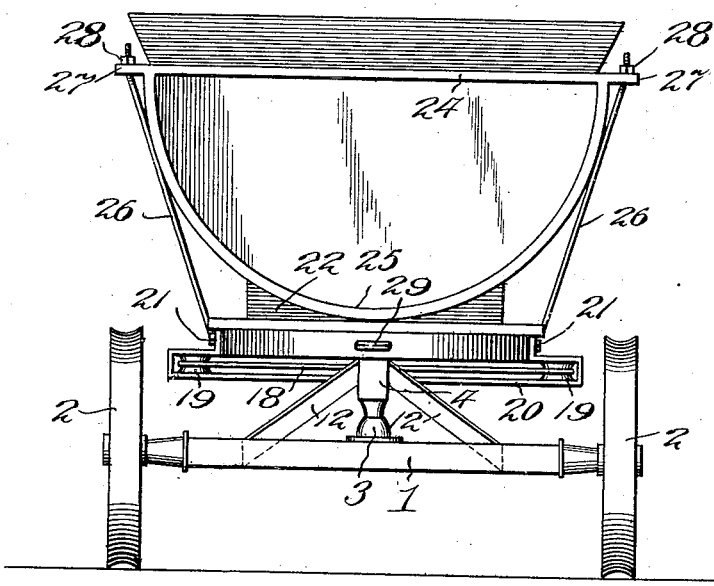
Figure 3:
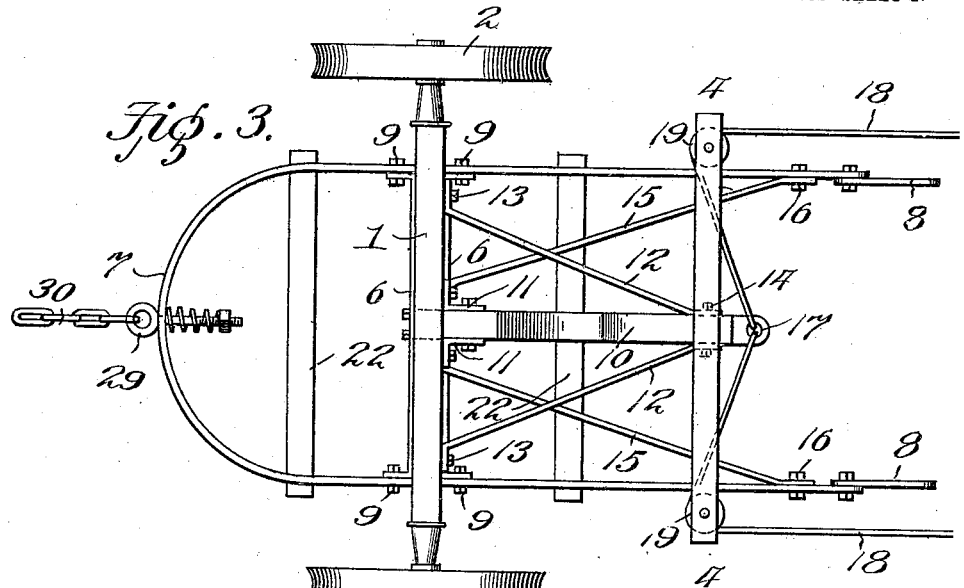
Figure 4:
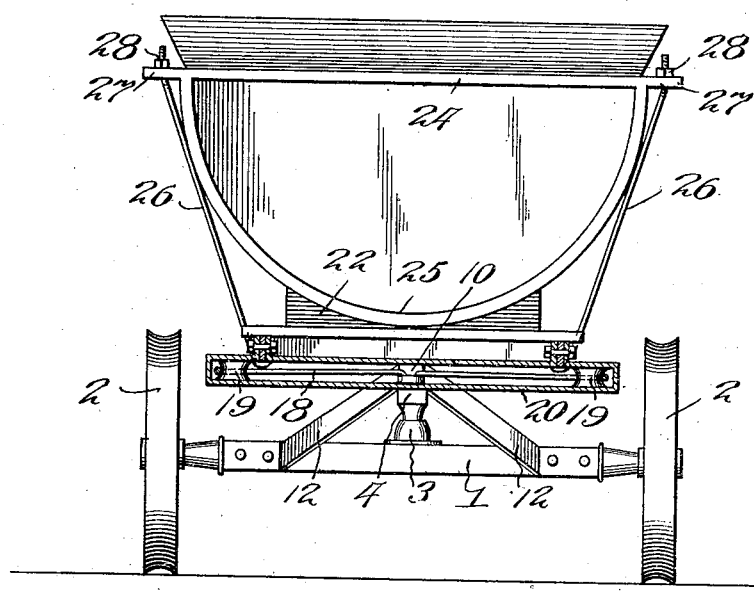

These and other objects may be attained by means of the construction illustrated in the accompanying drawings, in which:

Figure 1 is a longitudinal section of a tender made in accordance with my invention. Fig. 2 is a front elevation of the same. Fig. 3 is an underside plan view of the frame of the tender. Fig. 4 is a transverse sectional view on the line 4—4, of Fig. 3.

Referring to the drawings for a more particular description of my invention, the numeral 1 designates the axle, and 2 are the wheels mounted to rotate on said axle. 3 is the socket member of a ball and socket joint, and 4 is the ball member thereof, said socket member being secured to the axle 1, and the ball member being connected at its upper end by means of bolts 5 to cross bars 6. A metal frame consisting of a bar curved at its rear end, as at 7 is provided on its front ends with links or clevises 8 adapted to be connected to the rear end of the traction engine. The cross bars 6 are bolted, as at 9, to the frame bar 7. A tongue 10 is connected at its inner end to brackets 11 bolted to the axle 1, and braces 12 bolted to the axle 13 converge to the front and are connected to the tongue by means of bolts 14. Braces 15 are secured to the axle 1 and connected by bolts 16 to the frame bar 7. The front end of the tongue 10 is provided with an aperture 17 to which a cable 18 is secured, said cable passing around pulleys 19 journaled in a frame 20, the upper ends of which are bolted at 21 to the frame bar 7, as shown more particularly in Fig. 2. Extending across the frame are transverse bars 22 and supported upon these bars is a combined water tank and coal bunker 23 held rigidly in place by means of braces 24 provided with curved members 25 disposed at the front and at the rear of said receptacle 23 and held in place by means of long bolts 26, the lower ends of which are connected to the frame 7 and their upper ends passed through lugs 27 on the braces 24, and fitted with nuts 28. A spring clevis 29 secured to the curved portion of the frame 7 is provided with a chain 30 for connection to a threshing machine or other implement which accompanies the traction engine and tender.

The operation of my invention may be briefly described as follows: The front ends of the cable 18 are connected to the front axle of the traction engine, and hence when said axle turns, the tongue 10 of the tender is moved to one side or the other of the frame 20, thus moving the axle 1 on the ball bearing to one side or the other to follow the course taken by the traction engine. The combined water tank and coal bunker thus accompanies the traction engine to replenish the boiler and to feed the furnace.

Having thus described the invention, what I claim is:

1. A tender for traction engines comprising a frame, an axle, wheels mounted on the axle, a ball and socket connection disposed centrally of the axle and connected to the frame, braces extending from the axle to the frame, a tongue secured to the axle, a cable connected to the front end of the tongue, pulleys journaled in a frame, said cable passed around said pulleys and adapted to be connected to the front axle of a traction engine.

2. A tender for traction engines comprising a frame, a combined water tank and coal bunker mounted on the frame, an axle mounted on wheels, a ball and socket connection between the frame and axle, braces extending from the axle to the frame, a tongue connected to the axle, a cable connected to the tongue, said cable passing around pulleys extending to the front axle of the traction engine, clevises connected to the frame for attachment to the traction engine, and a clevis at the opposite end of the frame.

3. In a tender for traction engines, a frame, a combined water tank and coal bunker supported upon the frame by means of cross braces having curved members, and bolts connected to the cross brace and to the frame, an axle, wheels mounted thereon, a ball and socket connection between the axle and frame, a tongue secured to the axle and the front ends mounted in a frame, rollers journaled in the frame, a cable connected to tongues and passing over the rollers, the front ends of said cable adapted to be connected to the front axle of a traction engine.

In testimony whereof, I affix my signature in presence of two witnesses.

ERNEST MAHR.

Witnesses:
 JOHN H. MCDONALD,
 A. C. MOORE.